United States Patent [19]

Shimada et al.

[11] Patent Number: 5,140,733

[45] Date of Patent: Aug. 25, 1992

[54] METHOD OF FIXING FLANGE TO PERIPHERAL EDGE OF A DISC SPRING

[75] Inventors: Toshinori Shimada; Shinichi Ohgashi; Shigeaki Motokawa; Kihachi Onishi, all of Higashiosaka, Japan

[73] Assignee: Tatsuta Electric Wire & Cable Co., Ltd., Higashiosaka, Japan

[21] Appl. No.: 460,053

[22] PCT Filed: May 23, 1989

[86] PCT No.: PCT/JP89/00512

§ 371 Date: Jan. 16, 1990

§ 102(e) Date: Jan. 16, 1990

[87] PCT Pub. No.: WO89/11601

PCT Pub. Date: Nov. 30, 1989

[30] Foreign Application Priority Data

| May 25, 1988 | [JP] | Japan | 63-129392 |
| Jan. 20, 1989 | [JP] | Japan | 1-5882 |
| Jan. 20, 1989 | [JP] | Japan | 1-12879 |
| Feb. 8, 1989 | [JP] | Japan | 1-49357 |
| Feb. 20, 1989 | [JP] | Japan | 1-18718 |
| Feb. 20, 1989 | [JP] | Japan | 1-18719 |
| Feb. 28, 1989 | [JP] | Japan | 1-49352 |
| Feb. 28, 1989 | [JP] | Japan | 1-49353 |
| Mar. 15, 1989 | [JP] | Japan | 1-64836 |

[51] Int. Cl.$^5$ ............... B21F 35/00; F16F 1/34; B21D 39/00

[52] U.S. Cl. .................... 29/173; 29/509; 267/161

[58] Field of Search ............ 267/160, 161, 162, 164; 92/90, 98 R, 99, 104; 200/5 A; 29/173, 451, 509, 511

[56] References Cited

U.S. PATENT DOCUMENTS

| 116,669 | 7/1871 | Blake | 92/104 X |
| 2,220,902 | 11/1940 | Hastings et al. | 92/104 X |
| 2,659,310 | 11/1953 | Rybas | 92/98 R X |
| 3,070,029 | 12/1962 | Russell | 92/104 X |
| 3,508,020 | 4/1970 | Culver | 267/161 X |
| 4,433,217 | 2/1984 | Griffith | 200/5 A X |
| 4,476,355 | 10/1984 | Mital | 200/5 A |
| 4,711,434 | 12/1987 | Haag | 267/161 |
| 4,809,589 | 3/1989 | Bertrand | 92/104 X |

FOREIGN PATENT DOCUMENTS

| 564300 | 6/1955 | Canada | 92/104 |
| 538945 | 10/1928 | Fed. Rep. of Germany | 92/104 |
| 1262149 | 10/1986 | U.S.S.R. | 267/161 |

Primary Examiner—Robert J. Oberleitner
Attorney, Agent, or Firm—Wenderoth, Lind & Ponack

[57] ABSTRACT

A cone-shaped disc spring having a central circular portion, a peripheral portion concentric with the circular portion, and an intermediate portion connecting the central circular portion with the peripheral portion, the central circular portion and said peripheral portion being in planes spaced from each other in a direction perpendicular to the planes, the intermediate portion being corrugated and having at least two spiral corrugations extending from two points spaced around the perimeter of the circular portion, said points being at equal angular intervals from each other, each spiral corrugation having an equal width over the entire length thereof. A method of placing a flange over the peripheral edge of the disc spring involving using punches to form an L-shaped flange blank of the peripheral edge in a series of steps.

1 Claim, 5 Drawing Sheets

METHOD OF FIXING FLANGE TO PERIPHERAL EDGE OF A DISC SPRING

FIELD OF INVENTION

The present invention relates to a coned disc spring having a uniform deflectability over the entire periphery thereof, and specifically a coned disc spring made mainly of a steel plate, stainless plate, rubber plate or plastic plate and suitable for use as a diaphragm or a return spring for a key top of a keyboard switch.

The present invention also relates to the use of the such a cone-shaped disc spring as a diaphragm or a return spring for a key top of a keyboard switch, and to a pressure detector using the diaphragm, and to a method for mounting the diaphragm on a support member.

BACKGROUND ART

One prior art coned disc spring for use as a diaphragm is shown in FIG. 19 which is made of a plate-shaped material and has a circular central portion 10 and its peripheral portion corrugated to form rings P with a wave-shaped cross-section. The wave rings P in the drawings indicate the troughs of the corrugations (to be so understood hereinafter).

However, since this article Dc has its peripheral fixing portion subjected to brazing or the like, it has a high rigidity at this portion. Also it has a high rigidity at its central portion because the radius of curvature is small at this portion. Thus it is less liable to deflect at its peripheral and central portions. As a result, the deflecting force tends to concentrate on the intermediate portion thereof. This will increase the possibility of buckling and cracking owing to metal fatigue if the plate is made of a metal and also the characteristics, specifically the restoring force, of the plate can change during long use.

Typical keyboard switch structures are shown in FIGS. 16-18, but with the cone-shaped spring of the present invention therein. The one shown in FIG. 16 has a contact 42 on the inner bottom surface of a keyboard case 41. If a conventional disk-shaped spring is provided above the contact 42, as a key top 43 is depressed, the spring, which is connected to the key top 43 through a stem 44, will deflect downwards, thus actuating the contact 42. The key top 43 will be returned to its original position by the restoring force of the spring D. It is also known to form part of the contact 42 from the spring D if the spring has conductivity. The key switch shown in FIG. 17 has a coil spring 46 interposed between the keytop 43 and the stem 44 to improve the depressibility. The key switch shown in FIG. 18 has a lever 45 interposed between the disc shaped spring and the stem 44. The abovementioned depressibility refers to the relationship between the depth of depression of the key and the depressing force exerted by a fingertip.

Such conventional disc-shaped spring as used in the above-described switches has an ordinary flat pressure-receiving surface (contact surface with the stem 44). No modifications thereto have been proposed. Their deflectability and restorability after having been deflected depend largely on the properties of their material.

But such an improvement-by-material approach is not only reaching its limit but is also costly.

Also, the keytop 43 is not always depressed at the center of its top surface. A skilled operator who can type at a high speed tends to press the keytop at its corner portion. This has the following effect. By depressing the keytop at its corner, the depressing force is divided into a vertical component and a horizontal component, thus deflecting the spring D with both component forces. This may improve the operability.

But if the spring has a flat pressure-receiving surface, it will offer resistance to the horizontal component but will not deflect. Thus the operability is not good.

If a coned disc spring is used as a diaphragm, it is a common practice to use two annular flanges 22 to grip it therebetween from both sides along its edge, like the flanges 22 as shown on the disc D of the present invention in FIGS. 8(a) and (b).

The flanges 22 are bonded to the edge of the coned disc spring by means of an epoxy or silicone adhesive or by soldering at low temperature (190° to 210° C.).

But with such conventional bonding means, it is necessary to keep the coned disc spring and the flanges fixed in position until the adhesive or the solder hardens. Thus the productivity is bad. Further since adhesives and solders have poor heat resistance, they cannot keep their characteristics for a long period of time but tend to degrade with time.

Further it requires a highly skilled technique to secure such conventional support means to the coned disc spring so that a uniform outward (centrifugal) tension will act on the spring D over the entire area. If the tension is not imparted uniformly, its properties will be badly affected.

FIGS. 14 and 15 show an ordinary pressure detector with a diaphragm according to the present invention. It has a casing 31 formed with a pressure detecting chamber 33 partitioned by a diaphragm D. One compartment 33a in the pressure detecting chamber 33 is filled with a pressure detecting fluid a. In another compartment 33b, there is provided a switch adapted to be activated when the diaphragm D deflects by a predetermined amount.

When such conventional pressure detectors use one having a diaphragm (coned disc spring) $D_c$ as shown in FIG. 19, this diaphragm $D_c$ has a problem that it tends to degrade with time. If it degrades, the detected value of pressure will change. This will lower its reliability.

It is therefore an object of the present invention to provide a coned disc spring and a diaphragm which deflects uniformly in a circumferential direction so that uniform stress will act thereon over the entire area.

It is another object of the present invention to apply the coned disc spring to a diaphragm assembly so that it can maintain a high reliability of detection for many years and to a keyboard switch to improve its operability.

It is still another object of the present invention to provide a method for simplifying the mounting of supporting means of the diaphragm and a method for imparting a uniform centrifugal tension to the diaphragm over the entire area thereof.

DISCLOSURE OF THE INVENTION

The coned disc spring according to the present invention comprises a central circular portion and a peripheral portion corrugated in such a manner as to form spirals each extending from a predetermined point on the perimeter of the circular portion.

With this arrangement, if pressure is applied to any given point on the surface of the coned disc spring, deflection owing to the pressure will be transmitted to the entire area of the spring through the spiral waves.

Thus the spring is subjected to a uniform stress and can deflect uniformly with respect to a circumferential direction.

The spirals may be formed so as to extend from at least two predetermined points on the perimeter of the circular portion. This will serve to equalize the rigidity of the spring at the peripheral portion thereof and thus allow the spring to deflect equally in a circumferential direction. Further by providing an odd number of spiral waves, the radii of curvature of the spiral waves over the entire area will come close to one another. This serves to further equalize the rigidity and allow the spring to deflect more uniformly in a circumferential direction.

If the spirals are formed so that their crests and troughs are continuous with each other, the spring can deflect more smoothly. By providing inner and outer wave rings so as to be concentrical with the circular central portion, a stress which acts on the central portion in such a manner as to cause an upheaval of the spring will be absorbed and dispersed in the inner concentrical wave ring, whereas a wrinkle-forming stress produced along the outer peripheral portion will be absorbed and dispersed in the outer wave ring. This effect will further strengthen the spirals joined together at their starting and terminal ends.

Therefore, a diaphragm or a diaphragm assembly made by use of the above-described coned disc spring, which has the above-described characteristics, can retain a certain property (restoring force) for a prolonged period of time and thus its reliability increases.

If the above-described coned disc spring is used as a return spring for a keytop of a keyboard switch, a depressing force applied to the coned disc spring can be transmitted over the entire area through the wave pattern. The spring will deflect not only with a vertical component of the depressing force but with its horizontal component. Thus the operability improves.

When fixing the diaphragm according to the present invention by holding its outer peripheral edge by use of support members, packings fitted in annular opposed surfaces of the support members are pressed against the outer edge of the diaphragm. The packings have their contact surfaces tapered outwardly toward the outer edge of the diaphragm so as to push the outer edge outwardly.

Since the outer edge of the diaphragm is pushed outwardly by the packings, the diaphragm can be supported so that a centrifugal tensile force will act on its entire area.

A method for fixing the outer peripheral edge of the diaphragm to an inner surface of an annular flange having a sectional shape of the letter L may comprise:

the first step of pressing the outer peripheral edge of said diaphragm downwardly by means of a punch having its bottom surface or a pressure application surface curved outwardly and downwardly, so as to insert the peripheral edge into a downwardly extending groove formed in the inner surface of the flange along a fold line;

the second step of placing the flange on a female die so that a bottom surface and an inner surface of a horizontal portion of the flange comes into close contact with the female die, and pressing the outer peripheral edge at the top surface of an upright portion of the flange by means of a punch having its bottom surface or a pressure application surface curved outwardly and downwardly to push it downward and inwardly; and the third step of pressing downwardly the upright portion of the flange which has been pushed down in the preceding step with a pressure application surface tapered outwardly and upwardly, with the flange placed on the female die.

If the diaphragm is made of a metal, the flange should be made of a material similar to that for the diaphragm and preferably of an annealed material.

With this arrangement, the outer peripheral edge of the diaphragm is inserted in the groove in the first step and the upright portion of the flange is pressed downwardly and inwardly in the second step. This will collapse the groove, thus fixing the outer edge of the diaphragm to the flange.

In this state, the upright portion of the flange is further pressed (caulked) to firmly grip the outer edge of the diaphragm in the flange. An outward (centrifugal) tensile force will be given to the outer edge of the diaphragm through the contact surfaces tapered outwardly and upwardly.

BEST MODE FOR EMBODYING THE INVENTION

The present invention will be described in detail with reference to the accompanying drawings.

EMBODIMENT 1

In this embodiment, a coned or cone-shaped disc spring is used as a diaphragm. It is made by finishing a hoop of stainless foil having a thickness of 0.015 mm and a width of 34 mm so that its diameter will be 25.4 mm.

Figure 1:
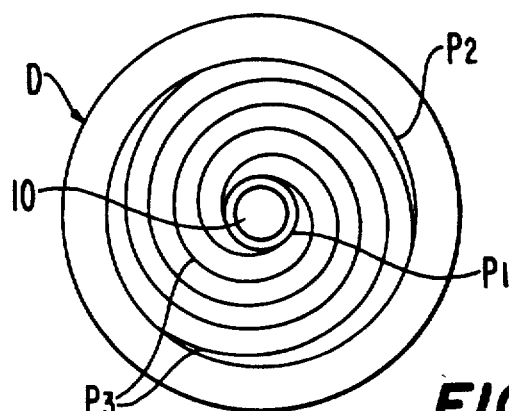
FIG. 1 is a schematic plan view of a preferred embodiment of the coned disc spring according to the present invention.
Figure 2:
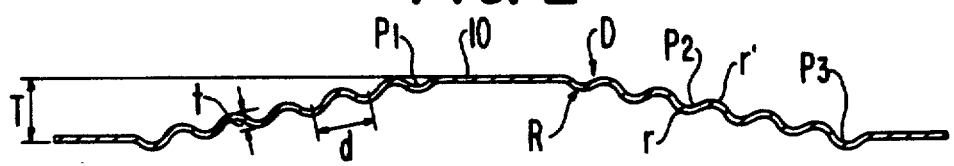
FIG. 2 is a diametrical sectional view of the same.

FIGS. 1 and 2 show embodiments made of the above-described foil. In these figures, the distance d between adjacent waves $P_1$, $P_2$ and $P_3$ (generally represented P), i.e. the distance between adjacent troughs except their junction areas, is 1.8 mm, the diameter of the circulur inner wave ring (trough) $P_1$ concentric around circular center portion 10, is 5.9 mm and the diameter of the outer wave ring $P_2$ concentric with ring $P_1$ is 16.7 mm. The cross-sections of spirals $P_3$ shown in FIG. 2 have radii of curvature r and r' of 1.5 mm and 1.0 mm at their trough and crest portions, respectively, and extend outwardly from three points on the inner wave ring P1 spaced apart from one another at equal angular intervals. The height of wave t is 0.3 mm, the difference of height T between the peripheral portion and the central portion is 1.5 mm, and the radius of curvature R of the diaphragm D is 100 mm.

In the embodiment, each spiral $P_2$ makes one turn. But the structure is not limited thereto. Also the above-mentioned dimension are not limited to the abovementioned figures but should be determined through experiments or the like taking into consideration the mounting position and the material of the diaphragm D. Instead of a stainless foil, the diaphragm may be made of a copper alloy foil such as phosphor bronze and beryllium copper, rubber, plastic or any other known material.

The diaphragm D is made by press molding a material put in a mold having a design based on the predetermined dimensions (shape) and then by punching the material to form a press-molded product. The mold is made in principle by electrical discharge machining and put to use after making a suitable adjustment. Since the diaphragm is press-molded in such a way that both ends of the spirals $P_3$ will merge with the inner and outer wave rings $P_1$ and $P_2$, the stress acting on the spirals $P_3$ during press-molding is absorbed by the wave rings $P_1$ and $P_2$. Thus no wrinkles are formed on the diaphragm during press-molding.

Figure 3:
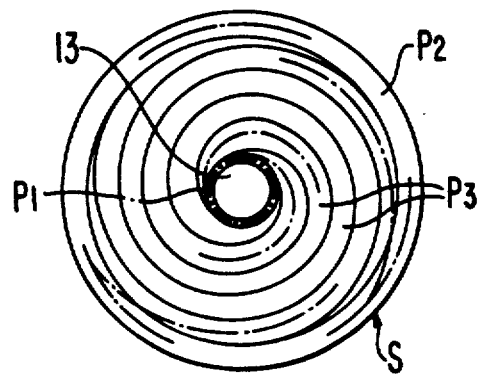
FIGS. 3 and 4 are views showing how the disc spring is manufactured.

The mold is made by an electrode S for electrical discharge machining. The electrode may be made by use of a milling machine capable of three-dimensional numerical control. More specifically, after inputting the specifications of the diaphragm D in the milling machine, the wave pattern P shown in FIG. 3 is formed on a plate as a material for the electrode by an end mill of the milling machine.

Figure 4:
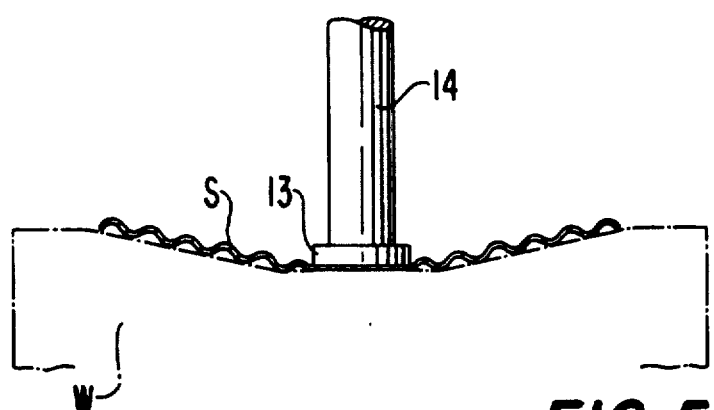

As shown in FIG. 4, a rod 14 for supporting an electrode is attached to the thus made electrode S through a boss 13 and the electrode is mounted on an electric discharge machine to produce one of the molds W (male and female molds). The mold thus made is then used as an electrode to produce the other mold by electrical discharge machining.

EMBODIMENT 2

Figure 5:
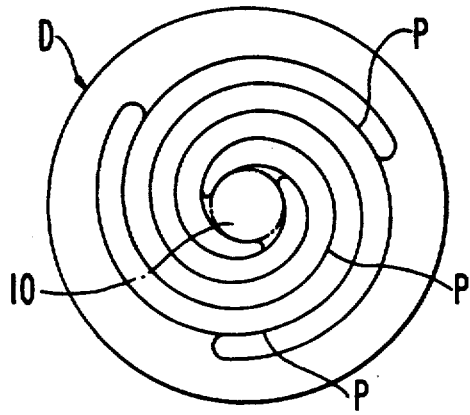
FIG. 5 is a schematic plan view of another embodiment.
Figure 6:
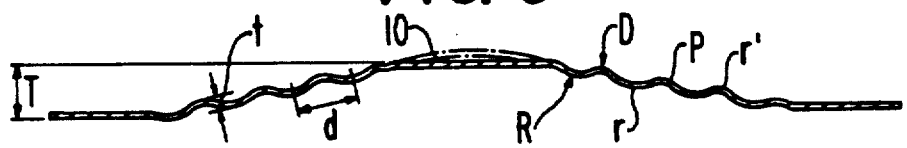
FIG. 6 is a diametrical sectional view of the same.

As shown in FIGS. 5 and 6, the concentric inner and outer wave rings $P_1$ and $P_2$ of the first embodiment are omitted in this embodiment. Three spirals P extend in juxtaposition with one another from three points on an inner circle 10 spaced apart from one another at equal angular intervals.

Figure 7:
FIG. 7 is a partial sectional view of still another embodiment.

Specimens 1–4 according to this embodiment were prepared by use of the manufacturing means used in the embodiment 1. Their dimensions (the values of t, T, etc.) are shown in Table 1. They are all made of a stainless foil and have the same dimensions, that is, 0.015 mm thick, 100 mm radius of curvature and 25.4 mm diameter. FIG. 7 shows the sectional shape or the wave pattern P of the specimen 1 while FIG. 6 shows those of the others.

The number of turns of the wave pattern P is determined by the distance d between the adjacent troughs thereof. Those of the specimens 1 and 2 and the specimens 3 and 4 were one and a half and two, respectively.

Figure 8A:
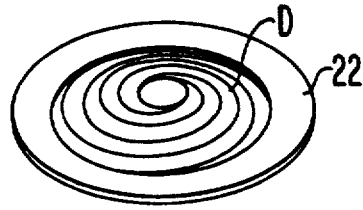
FIG. 8a is a perspective view showing how the disc spring is used.
Figure 8B:
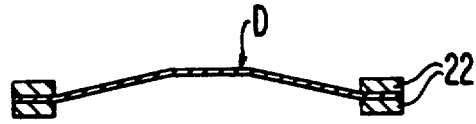
FIG. 8b is a sectional view of of the spring of FIG. 8a, FIG. 9 is a view showing the results of measurement of pressure variation on the spring.

Annular flanges 22 were secured to the thus made diaphragms D to support them, as shown in FIG. 8. Displacement under pressure was measured for each specimen. The results are shown in FIG. 9.

Figure 9:
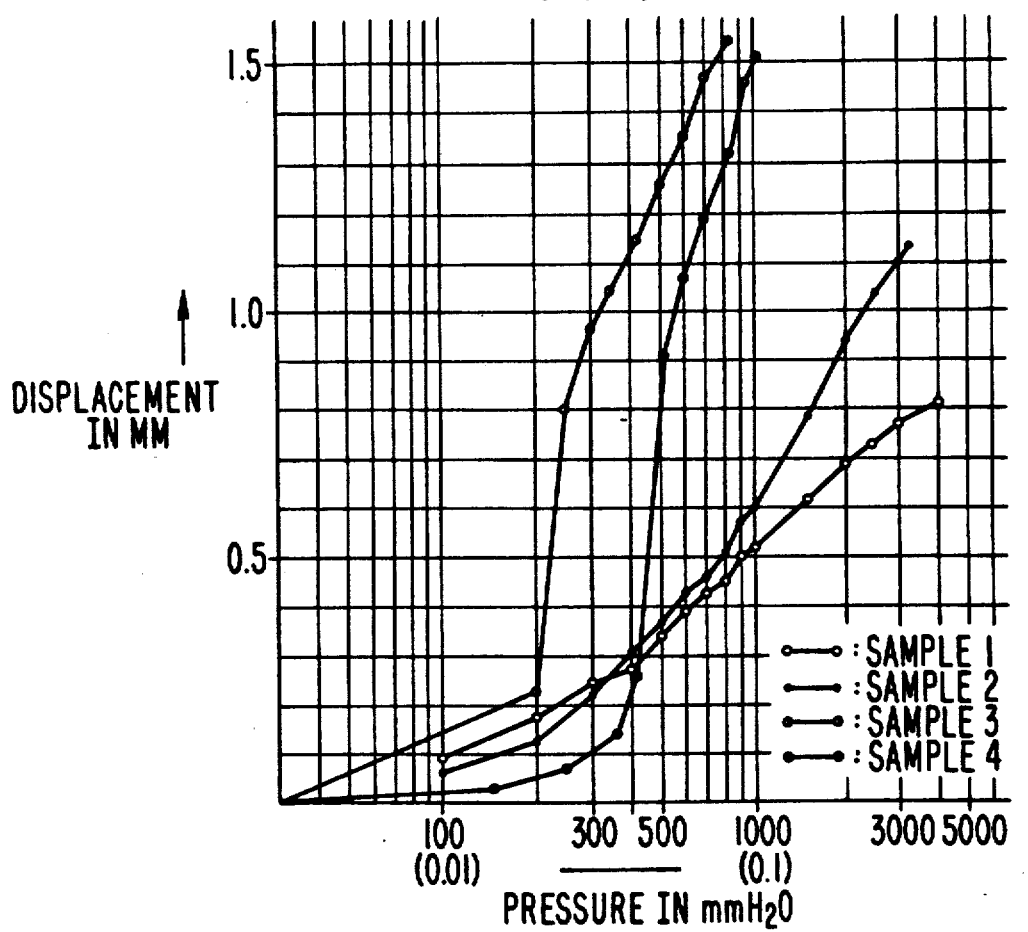

As is apparant from FIG. 9, the curves for the specimens 3 and 4 have a portion sloping at a steep angle (200–500 mm $H_2O$). Thus the digital output can be changed over between ON and OFF at this portion. The results show that any of the specimens can be satisfactorily used for the purposes required.

Figure 10A:
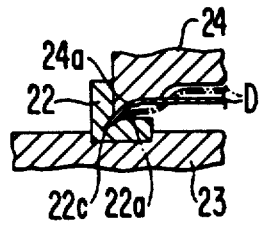
FIGS. 10a to 10d are views showing one example of the manner of fixing a flange the diaphragm.

To mount the diaphragm D in a fixed position, an annular flange blank 22 (made of SUS 304 or 316 steel under JIS) having a sectional shape of the letter L is fixed in position, as shown in FIG. 10a, the diaphragm is put on a horizontal portion 22a of the flange 22 as shown by chain lines, and then a punch 24 having its bottom surface 24a as a pressure application surface curved outwardly and downwardly is pressed against the outer edge of the diaphragm D to deflect its edge downwardly into a flat shape, thus pushing it into a downwardly and outwardly extending groove 22c formed in the inner surface of the flange blank 22 along the apex of the acute angle between the arms of the L-shaped flange blank. In this state, the edge of the diaphragm D, which is urged to return to its original position, will abut the top surface of the groove 22c so as to be kept in this position.

Figure 10B:
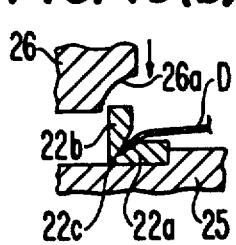

Then, as shown in FIG. 10b, the flange blank 22 is placed on a female die 25 so that its bottom and inner sides will be brought into close contact with the female die 25 and a punch 26 having its bottom surface 26a as a pressure application surface curved outwardly and downwardly is pressed against the outer top edge of an upright portion 22b of the flange blank 22 to push the upright portion down and inwards. Thus the groove 22c will be closed and the outer edge of the diaphragm D will be held by the parts of the flange 22 (see FIG. 10c).

Figure 10C:
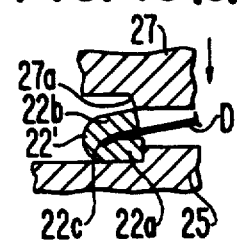
Figure 10D:
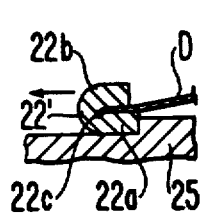

Further, as shown in FIG. 10c, after removing the punch 26, a punch 27 having its bottom surface 27a as a pressure application surface curved outwardly and upwardly is pressed against the thus bent upright portion of the flange blank 22 to further bend the flange and thus to tightly hold the edge of the diaphragm D in the finished flange 22'. In this state, an outward (centrifugal) tensile force is applied uniformly to the entire peripheral portion of the diaphragm D. This will cause the diaphragm to deflect uniformly over the entire area thereof and thus serve to stabilize its characteristics.

Figure 11A:
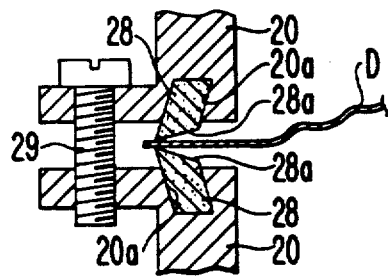
FIGs. 11a to 11b are views showing another example of the manner of fixing a flange to the diaphragm.
Figure 11B:
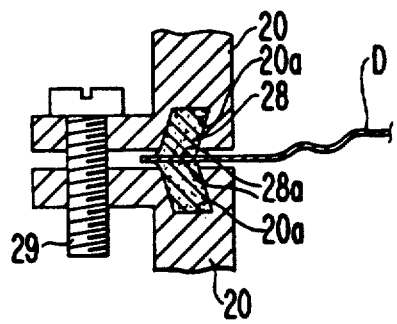

FIGS. 11a and 11b show another means for supporting the diaphragm D. It comprises support members 20 each provided with a dovetail groove 20a and packings 28 received in the dovetail grooves 20a and having contact surfaces 28a tapered outwardly toward the outer edges to form abutting surfaces with the diaphragm D. The diaphragm D has its outer edge inserted in between the abutting surfaces of the packings 28 and secured firmly by means of bolts 29. As the bolts 29 are tightened, the packings 28 will deflect outwardly, thus biasing the outer edge of the diaphragm D in a centrifugal direction. The diaphragm D will be subject to a tensile force in the centrifugal direction over the entire area thereof.

In the embodiments 1 and 2, the diaphragm D is made of a foil. But if the diaphragm has a larger diameter, or if the object being measured has a higher pressure, it may be made of a thicker material.

EMBODIMENT 3

Figure 12:
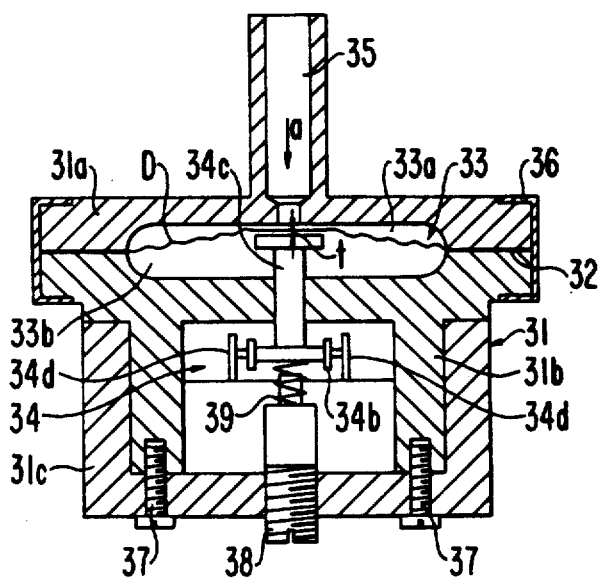
FIGS. 12 and 14 are sectional elevation views of embodiments of a pressure detecting device.
Figure 13:
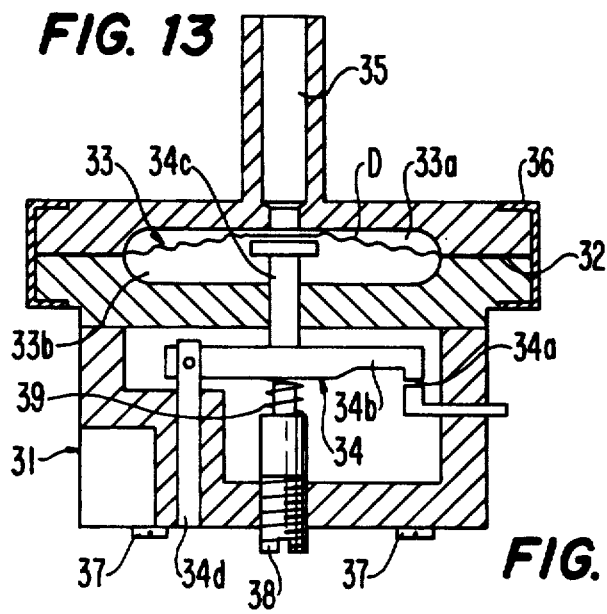
FIGS. 13 and 15 are sectional elevation views of the embodiments of FIGS. 12 and 14 but taken at right angles to FIGS. 12 and 14, FIGS. 16 to 18 are sectional views of disc springs of the present invention incorporated in embodiments of prior art keyboard switches.

In this embodiment, the aforementioned diaphragm D is used as a pressure detector. As shown in FIGS. 12 and 13, a detector casing 31 comprises three members 31a, 31b and 31c. A pressure detecting chamber 33 is defined between the members 31a and 31b. The diaphragm D is held between the members 31a and 31b through a packing 32. The diaphragm D partitions the pressure detecting chamber 33 into two compartments 33a and 33b. A fluid a, the pressure of which is to be detected, adapted to be introduced into the compartment 33a. The diaphragm D deflects as the pressure of the fluid fluctuates. The bonded surface between the members 31a and 31b is hermetically sealed by means of a seal ring 36.

The member 31c of the casing 31 is secured to the member 31b by screws 37. A switch 34 is provided in the member 31c. The switch 34 comprises a contact 34a, a lever 34b, and a ram 34c. The ram 34c extends through the member 31b so that its top end will be contacted by the diaphragm D. Its bottom end is abutting the 34b pivotally supported by a support lever 34d. A hydraulic pressure adjusting element 38 is screwed through the member 31c and is in abutment with the bottom surface of the lever 34b through a spring 39. The lever 34b and the ram 34c can be located in a desired position by adjusting the length of engagement of the adjusting element 38. The adjusting element 38 is adjusted so that the ram 34c will be pushed by the diaphragm D when it returns to its original position after having been deflected, thus actuating (turning ON or OFF) the contact 34a.

Figure 14:
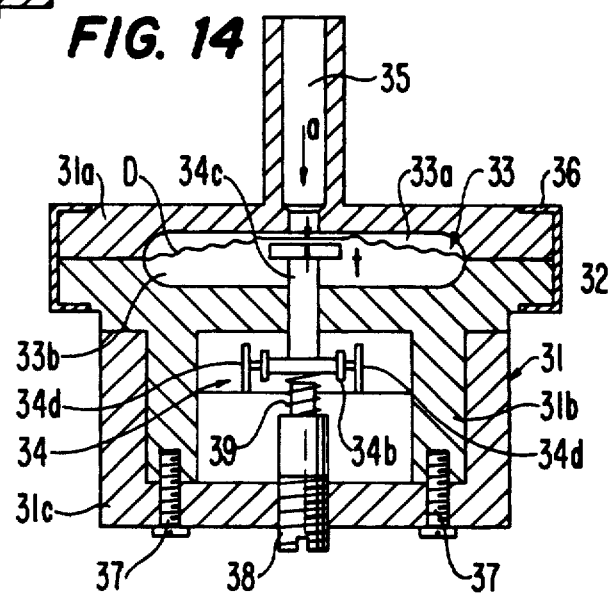
Figure 15:
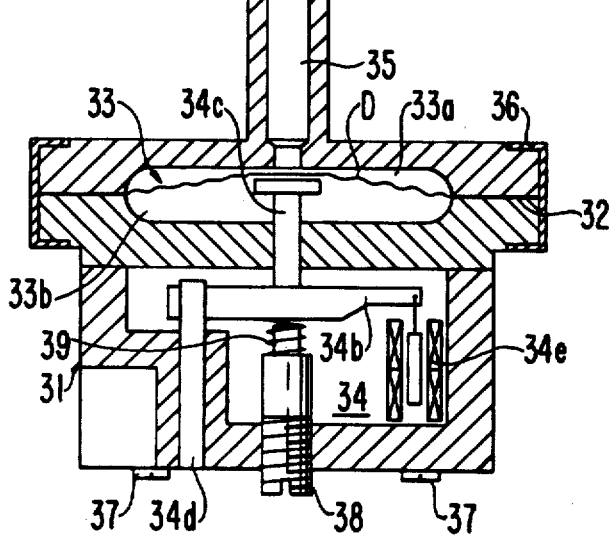

In the embodiment shown in FIGS. 14 and 15, the sensor for detecting the deflection of diaphragm D is composed of a differential transformer 34e, a lever 34b for moving its iron core, and a ram 34c and the like, in place of the switch 34. As with the previous embodiments, the lever 34b and the ram 34c can be located in a desired position by adjusting the length of engagement of the adjusting element 38. The adjusting element 38 is adjusted so that the diaphragm D will push the ram 34c to move the iron core of the differential transformer 34e when the diaphragm is deflected into its straight state. The detected value should be compensated for by taking into account the biasing force of the spring 39.

The pressure detecting device of the diaphragm type of this embodiment can be used as a detecting unit for the monitoring and control of the level of water in a water tank by mounting it on the tank bottom so that the water pressure will be applied to the detecting chamber 33a. For example, this device can be used to monitor and control the level of water in a full-automatic washing machine.

This device can also detect the fluctuation of back pressure in a fluid feed line by introducing the fluid through this feed line and thus can be used as a detecting unit for controlling valves provided in the fluid feed line. For example, this device may be provided in the supply and discharge lines of a hot water supply device, in the fuel supply line of an engine, or the air intake line of an air-conditioner to detect the clogging of lines and filters.

Also the device of this embodiment can be used as an instrument for monitoring and controlling the fluctuation of heat or for measuring temperature by sealing a thermal expansion gas in the pressure detecting chamber 33a. For example, this device can be used as a detecting unit in a fire alarm system.

EMBODIMENT 4

Figure 16:
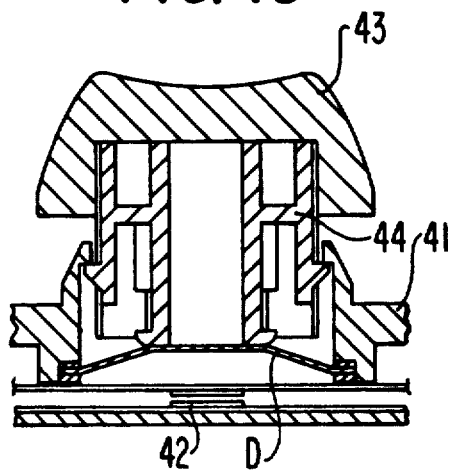
Figure 17:
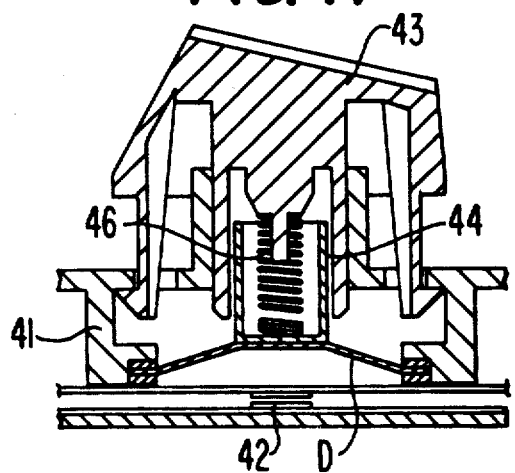
Figure 17:
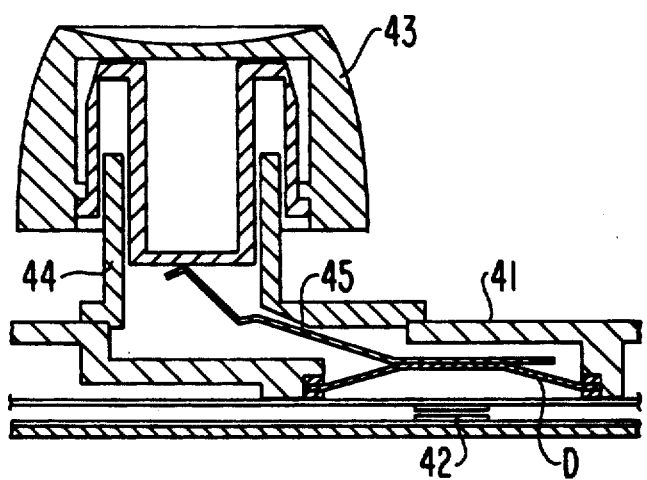
Figure 19:
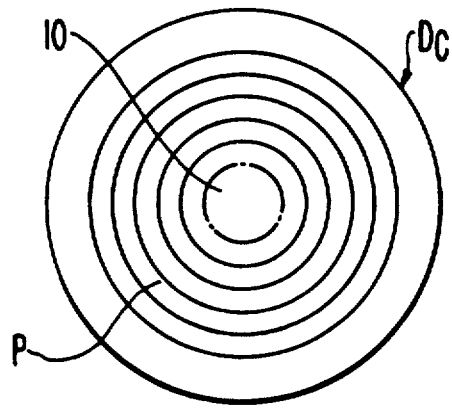
FIG. 19 is a schematic front view of a prior art coned disc spring.

In this embodiment, as shown in FIGS. 16 to 18, the coned disc spring of the embodiments 1 or 2 (which is in the form of the diaphragm D) is used as a return spring for a key top 43 of a keyboard switch. The keyboard has a construction as described in the "back ground art" herein-before. By pressing the key top 43, the coned disc spring D will deflect smoothly, turning on the contact 42. Upon releasing the key top, the coned disc spring D will return to its original position smoothly, thus turning off the contact 42. Thus the key top can be operated smoothly.

The coned disc spring according to the present invention can be used not only as a diaphragm or a return spring for a key top but also for other purposes.

INDUSTRIAL APPLICATION

The coned disc spring according to the present invention can be used as a return spring for a key top of the keyboard switch of a work processor for a personal computer and is suitable for use in other devices in which it is required to deflect smoothly and reliably.

TABLE 1

| | Material | Height: t | Height difference: T | Radius of curvature: r | Radius of curvature: r' | Distance between troughs: d |
|---|---|---|---|---|---|---|
| Example 1 | SUS304 BA | 0.3 mm | 1.5 mm | 1.5 mm | — | 1.723 mm |
| Example 2 | " | 0.2 mm | " | 0.7 mm | 0.7 mm | " |
| Example 3 | SUS316 BA | 0.15 mm | " | 0.5 mm | 1.5 mm | 1.054 mm |
| Example 4 | SUS316 ¾H | " | " | " | " | " |

BA: Luster softening agent
¾H: ¾ softening agent

What is claimed is:

1. A method for fixing a flange to the outer peripheral edge of a cone-shaped disc spring having a central circular portion, a peripheral portion concentric with said circular portion, and an intermediate portion connecting said central circular portion with said peripheral portion, said central circular portion and said peripheral portion being in planes spaced from each other in a direction perpendicular to said planes, said intermediate portion being corrugated and having at least two spiral corrugations extending from two points spaced around the perimeter of said circular portion, said method comprising:

providing around the periphery of the disc spring an annular flange blank having an L-shape cross-section and a downwardly and outwardly extending groove therein at the apex of the acute angle between the arms of the L-shaped flange blank;

placing the lower surface of the peripheral portion of the disc spring on the upper surface of the lower arm of the flange blank and pressing a downwardly and outwardly curved end surface of a punch against the perpheral portion of the disc spring for forcing the outer edge of said peripheral portion into said groove;

supporting the lower arm of the flange in a female die and pressing an outwardly and downwardly curved end surface of a further punch against the upper end of the vertically extending arm of the flange blank for bending the vertically extending arm over toward the upper surface of the peripheral portion of the disc spring; and pressing an outwardly and upwardly tapered surface of a still further punch against the thus bent over vertically extending arm for pressing said vertically extending arm tightly against said peripheral portion of the disc spring.

* * * * *